United States Patent
Kwak et al.

(10) Patent No.: US 7,649,570 B2
(45) Date of Patent: Jan. 19, 2010

(54) BROADCAST RECEIVER AND METHOD FOR DISPLAYING CHANNEL INFORMATION

(75) Inventors: Won Gee Kwak, Seoul (KR); Hyung Mo Park, Incheon (KR)

(73) Assignee: LG Electronics Inc., Seoul (KR)

( * ) Notice: Subject to any disclaimer, the term of this patent is extended or adjusted under 35 U.S.C. 154(b) by 832 days.

(21) Appl. No.: 11/342,590

(22) Filed: Jan. 31, 2006

(65) Prior Publication Data

US 2006/0176399 A1    Aug. 10, 2006

(30) Foreign Application Priority Data

Feb. 1, 2005   (KR)   .................... 10-2005-0009060

(51) Int. Cl.
   *H04N 5/45*    (2006.01)
   *H04N 5/445*   (2006.01)
(52) U.S. Cl. .................... 348/565; 348/564; 348/600
(58) Field of Classification Search ............... 348/725, 348/563–566, 589, 598, 569, 600, 728, 553; *H04N 5/445, H04N 5/45, 5/44, 9/74, 9/76*
   See application file for complete search history.

(56) References Cited

U.S. PATENT DOCUMENTS

| | | | | |
|---|---|---|---|---|
| 5,534,942 A | * | 7/1996 | Beyers et al. | 348/569 |
| 5,671,019 A | * | 9/1997 | Isoe et al. | 348/565 |
| 5,708,475 A | * | 1/1998 | Hayashi et al. | 348/564 |
| 6,339,453 B1 | * | 1/2002 | Chen et al. | 348/589 |
| 2005/0200611 A1 | * | 9/2005 | Goto et al. | 345/173 |

FOREIGN PATENT DOCUMENTS

| | | |
|---|---|---|
| KR | 92-003088 B1 | 4/1992 |
| KR | 1998-028144 A | 7/1998 |
| KR | 1998-043984 A | 9/1998 |
| KR | 10-2000-0019289 A | 6/2000 |
| KR | 2001-0048559 A | 6/2001 |
| KR | 10-2004-0063551 A | 7/2004 |
| KR | 10-2006-0081258 | 7/2006 |

* cited by examiner

*Primary Examiner*—Sherrie Hsia
(74) *Attorney, Agent, or Firm*—Birch, Stewart, Kolasch & Birch, LLP

(57) ABSTRACT

A broadcast receiver and a method for displaying channel information are disclosed, in which video signals of each channel are displayed in a multi-PIP mode when a channel list is displayed, so that a user can identify the channel list through video. Therefore, since broadcasting channel program information is displayed in real time in the multi-PIP mode of a video type, the user can share the broadcasting information with a broadcasting station in real time. Also, since the user can readily identify information on various broadcasting channels on a channel edition screen, it is possible to facilitate channel edition.

13 Claims, 2 Drawing Sheets

BROADCAST RECEIVER AND METHOD FOR DISPLAYING CHANNEL INFORMATION

This application claims the benefit of Korean Patent Application No. 10-2005-009060, filed on Feb. 1, 2005, which is hereby incorporated by reference as if fully set forth herein.

BACKGROUND OF THE INVENTION

1. Field of the Invention

The present invention relates to a broadcast receiver, and more particularly, to a method for displaying channel information, in which channel information is displayed to allow a user to readily view it.

2. Discussion of the Related Art

Digital broadcasting has been studied and developed based upon high picture quality, multi-channel, and multi-function. Particularly, broadcast providers have schemed out digital broadcasting of multi-channel and high picture quality to provide consumers having various tastes and various levels as well as the existing users with their desired broadcasting contents. To this end, a digital broadcast receiver suitable for such a trend toward multi-channel broadcasting is required.

A plurality of channels are essentially required to provide various broadcasting contents. In this case, there occurs some difficulty in selecting a channel for providing desired information among various channels.

In other words, in the related art, since only a channel number is displayed for channel edition such as setting a preference channel list, there occurs inconvenience in that a user should directly select a corresponding channel or refer to a broadcasting program list so as to acquire information on the channel.

In this case, a problem occurs in that the user requires much time and key input operation. Also, a problem occurs in that the user should fully search for respective channels to select a desired channel from a broadcasting program having a plurality of channels.

SUMMARY OF THE INVENTION

Accordingly, the present invention is directed to a broadcast receiver and a method for displaying channel information, which substantially obviate one or more problems due to limitations and disadvantages of the related art.

An object of the present invention is to provide a broadcast receiver and a method for displaying channel information, in which a plurality of broadcasting channel information are displayed on a channel edition screen along with video of a corresponding channel so as to allow a user to readily view the channel information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a broadcast receiver according to the present invention includes a video processor tuning at least one channel if a channel edition mode is provided and processing video signals of the tuned channel in a multi-PIP mode, a graphic processor graphically processing channel data information on each video signal of the video processor, and a multiplexer multiplexing the video signals processed in the multi-PIP mode and the graphically processed channel data information of the graphic processor to display the multiplexed signals on a TV screen.

In another aspect of the present invention, a method for displaying channel information includes a) tuning at least one channel if a channel edition mode is provided and processing video signals of the tuned channel in a multi-PIP mode, b) graphically processing channel data information on each video signal in the step a), and c) multiplexing the video signals processed in the multi-PIP mode and the graphically processed channel data information to display the multiplexed signals on a TV screen.

In other aspect of the present invention, a method for displaying channel information includes a) tuning at least one channel if a channel edition mode is provided and converting video signals of the tuned channel into SD grade video signals corresponding to low resolution to reduce a size of a screen, and b) displaying the video signals of each channel processed in the step a) in a multi-PIP mode to display a channel list.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
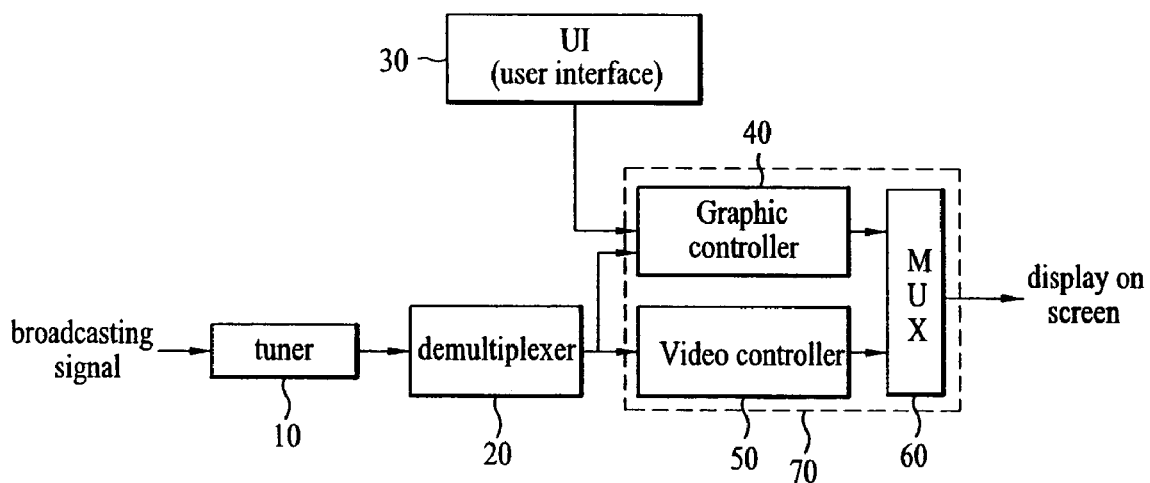
FIG. 1 is a block diagram illustrating a broadcast receiver for displaying channel information in a multi-picture-in-picture (PIP) mode in accordance with the preferred embodiment of the present invention.

FIG. 1 is a block diagram illustrating a broadcast receiver for displaying channel information in a multi-PIP mode in accordance with the preferred embodiment of the present invention.

The broadcast receiver according to the present invention includes a tuner 10, a demultiplexer 20, a user interface (UI) 30, and a video processor 70.

The video processor 70 includes a graphic controller 40, a video controller 50, and a multiplexer (Mux) 60.

A broadcasting signal, which corresponds to a stream of a compressed format (MPEG, H.263), is transmitted to the tuner 10 of the broadcast receiver (for example, set-top box and built-in TV).

The signal output from the tuner 10 is input to the demultiplexer 20, and is divided into video, audio, and data information (PSIP) in the demultiplexer 20.

Among the signals output from the demultiplexer 20, the video information is input to the video controller 50 and the data information is input to the graphic controller 40.

The video controller 50 serves to display the video information output from the demultiplexer 20 in a multi-PIP mode. The video controller 50 outputs the video information in a moving picture.

At this time, to improve processing speed of the video information, the video controller 50 outputs the video signals divisionally output from the demultiplexer 20 in standard definition (SD) grade video signals instead of high definition (HD) grade video signals by reducing a size of the screen.

The small sized video signals of the standard definition grade corresponding to low resolution and output from the video controller 50 allow the user to reduce the amount of data while maintaining channel information, thereby improving the processing speed.

In other words, the multi-PIP mode is an improved one of a PIP mode, and displays information on a plurality of broadcasting channels on a plurality of small sized sub-screens of a TV screen in a video type so as to allow the user to view the corresponding channel information. The screen of the multi-PIP mode and the video information of each broadcasting program channel displayed on the screen of the multi-PIP mode are executed by the video controller 50. Such a function of the video controller 50 maximizes space utility on the TV screen having a limited area so that a plurality of broadcasting channels can be displayed. Therefore, the broadcast receiver of the present invention could be used for a digital TV or a chip of a mobile communication terminal.

Furthermore, among the signals output from the demultiplexer 20, the data information (e.g., channel number, channel name, and so on) of the channel is input to the graphic controller 40.

In addition to the data information of the channel input from the demultiplexer 20, a signal indicating a channel selected by the user is input from the user interface 30 to the graphic controller 40.

At this time, the user interface 30 serves to connect the user's external input signal with the broadcast receiver.

The channel information on the input channel and the user's external input signal are provided to the graphic controller 40, so that the graphic controller 40 can graphically display the channel data information, such as channel number and channel name of the video screen displayed on the TV screen, in the multi-PIP mode.

At this time, to view the currently selected channel, flickering is displayed on the corner of the PIP screen corresponding to the channel selected through the user interface 30. And, if the user selects another channel, flickering is shifted to the corner of the PIP screen corresponding to the newly selected channel.

The signals processed by and output from the graphic controller 40 and the video controller 50 are multiplexed by the multiplexer 60 and then displayed on the TV screen.

Therefore, since the user can identify information on various broadcasting channels on the channel edition screen through video of the multi-PIP mode as well as the channel name and channel number, it is possible to readily acquire channel information for channel edition and reduce the time required to acquire the channel information.

Furthermore, various transmission routes exist in digital broadcasting. That is, a plurality of broadcasting programs are transmitted to one channel using a single physical channel (frequency band) or different broadcasting programs are transmitted per time slot. Therefore, in the present invention, the user can usefully receive and identify exact broadcasting channel information under a variable broadcasting environment.

Figure 2:
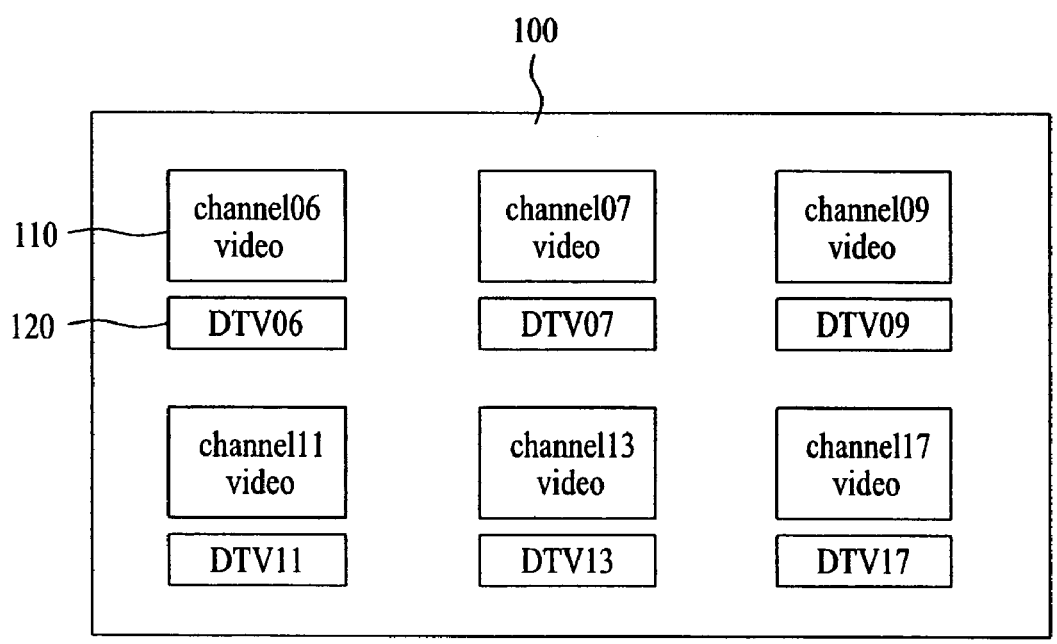
FIG. 2 illustrates an example of channel information displayed in a multi-PIP mode in accordance with the preferred embodiment of the present invention.

FIG. 2 illustrates an example of a channel list in which video signals of each channel are displayed in a multi-PIP mode in accordance with the preferred embodiment of the present invention.

First, a TV screen 100 includes a plurality of video displays 110 of corresponding channels and a plurality of broadcasting information displays 120 of corresponding channels.

A video moving picture of each channel is displayed in each of the video displays 110 while channel name, channel number, and so on of each channel are graphically displayed in each of the broadcasting information displays 120. The channel selected by the user is flickered on the corner of the corresponding broadcasting information display 120 to view that the user has selected the channel.

Figure 3:
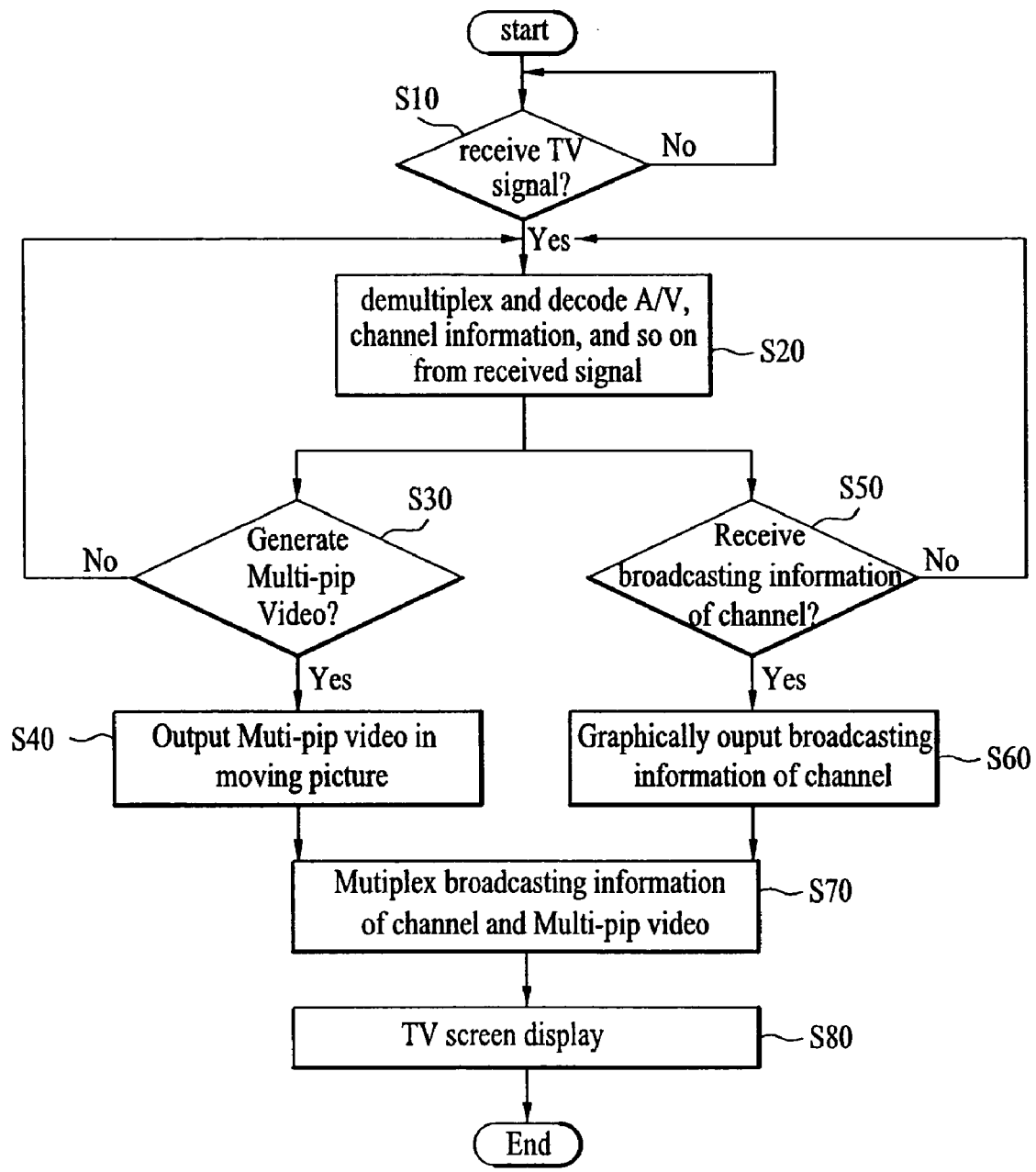
FIG. 3 is a flow chart illustrating a method for displaying channel information in a multi-PIP mode in accordance with the preferred embodiment of the present invention.

FIG. 3 is a flow chart illustrating a method for displaying channel information in a multi-PIP mode in accordance with the preferred embodiment of the present invention.

First, if the user selects channel edition through a menu, the tuner 10 receives the broadcasting signals to tune them (S10).

Audio, video and data signals from the signals tuned by tuner 10 are demultiplexed and decoded (S20). At this time, the demultiplexer 20 demultiplexes the signals while the video processor 70 decodes them.

In other words, the video controller 50 of the video processor 70 decodes the video signals among the signals demultiplexed and divided in step S20 and determines whether multi-PIP video signals are generated from the decoded video signals (S30). If the multi-PIP video signals are not generated, step S20 is again executed. On the other hand, if the multi-PIP video signals are generated, the video controller 50 outputs the multi-PIP video signals in a moving picture (S40).

The graphic controller 40 of the video processor 70 determines whether or not to receive data information (channel name, channel number, and so on) of the corresponding channel in the multi-PIP mode from the data signals demultiplexed and divided in step S20 (S50). Also, the graphic controller 40 graphically outputs the data information on the received channel using a graphic object (S60).

At this time, if the data information on the channel is not received in step S50, step S20 is again executed.

The multi-PIP video signals output in step S40 and the data information on the channel output in step S60 are multiplexed by the multiplexer 60 (S70).

The signals multiplexed in step S70 are displayed on the TV screen as shown in FIG. 2 (S80).

As described above, in the present invention, video of each channel is displayed in the multi-PIP mode when the channel list is displayed. In this case, the user can readily identify the channel list through the video.

The broadcast receiver of the present invention could be used for various products that will receive TV signals, such as PC, PDA, mobile communication terminal, and refrigerator, as well as a TV receiver.

The broadcast receive and the method for displaying channel information according to the present invention have the following advantages.

First, since the broadcasting channel program information is displayed in real time in the multi-PIP mode of a video type, the user can share the broadcasting information with the broadcasting station in real time.

Second, since the user can identify information on various broadcasting channels on the channel edition screen through video of each channel as well as data information such as channel name and channel number, it is possible to readily acquire channel information for channel edition and facilitate channel edition.

Finally, the broadcast receiver of the present invention could be used for various products that will receive TV signals, such as PC, PDA, mobile communication terminal, and refrigerator, as well as a TV receiver. In this case, it is possible to obtain the same effects through these products.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcast receiver comprising:
   a video processor configured to tune at least one channel if a channel edition mode is provided and processing video signals of the tuned channel in a multi-PIP mode;
   a graphic processor configured to graphically process channel data information on each video signal of the video processor; and
   a multiplexer configured to multiplex the video signals processed in the multi-PIP mode and the graphically processed channel data information of the graphic processor to display the multiplexed signals on a TV screen,
   wherein the channel data information is multiplexed in the video signals processed in the multi-PIP mode and is displayed in a channel list.

2. The broadcast receiver as claimed in claim 1, wherein the video processor processes the video signals of each channel in a moving picture.

3. The broadcast receiver as claimed in claim 1, wherein the video processor converts HD grade video signals into SD grade video signals and reduces a size of the screen.

4. The broadcast receiver as claimed in claim 1, wherein the channel data information includes channel name and channel number.

5. The broadcast receiver as claimed in claim 1, wherein the graphic processor graphically focuses a PIP screen of a channel selected by a user.

6. The broadcast received as claimed in claim 1, wherein the displayed channel list is editable.

7. A method for displaying channel information comprising:
   a) tuning at least one channel if a channel edition mode is provided and processing video signals of the tuned channel in a multi-PIP mode;
   b) graphically processing channel data information on each video signal in the step a); and
   c) multiplexing the video signals processed in the multi-PIP mode and the graphically processed channel data information to display the multiplexed signals on a TV screen,
   wherein the channel data information is multiplexed in the video signals processed in the multi-PIP mode and is displayed in a channel list.

8. The method as claimed in claim 7, wherein the step a) includes processing the video signals of each channel in a moving picture.

9. The method as claimed in claim 7, wherein the step a) includes converting HD grade video signals into SD grade video signals and outputting the video signals by reducing a size of the screen.

10. The method as claimed in claim 7, wherein the channel data information includes channel name and channel number.

11. The method as claimed in claim 7, wherein the displayed channel list is editable.

12. A method for displaying channel information comprising:
   a) tuning at least one channel if a channel edition mode is provided and converting video signals of the tuned channel into SD grade video signals corresponding to low resolution to reduce a size of a screen; and
   b) displaying the video signals of each channel processed in the step a) in a multi-PIP mode to display a channel list,
   wherein the step b) includes graphically processing channel data information on each video signal, the channel data information being multiplexed in the video signals processed in the multi-PIP mode and being displayed in the channel list.

13. The method as claimed in claim 12, wherein the displayed channel list is editable.

* * * * *